United States Patent [19]

Potokar

[11] Patent Number: 5,540,463
[45] Date of Patent: Jul. 30, 1996

[54] COUPLINGS FOR AUTOMOBILE AIR CONDITIONING SYSTEM CONDUITS

[75] Inventor: Edward Potokar, Richmond Heights, Ohio

[73] Assignee: Parker Hannifin Corporation, Cleveland, Ohio

[21] Appl. No.: 134,771

[22] Filed: Oct. 12, 1993

Related U.S. Application Data

[63] Continuation-in-part of Ser. No. 951,073, Sep. 25, 1992, Pat. No. 5,374,084.

[51] Int. Cl.⁶ .................................................. F16L 39/00
[52] U.S. Cl. .................. 285/319; 285/332.4; 285/382.5; 29/509
[58] Field of Search ................................. 285/319, 332, 285/332.4, 921, 382.4, 382.5, 256; 29/505, 509

[56] References Cited

U.S. PATENT DOCUMENTS

| 336,541 | 7/1887 | Watson . | |
|---|---|---|---|
| 753,096 | 7/1904 | Osteen . | |
| 798,795 | 9/1905 | Itrich et al. . | |
| 909,131 | 1/1909 | Antic . | |
| 991,374 | 5/1911 | Rolle . | |
| 1,220,868 | 3/1917 | McSwain . | |
| 3,207,534 | 9/1965 | Kimbrell et al. | 285/382. 5 X |
| 3,220,753 | 11/1965 | Kasidas | 285/256 X |
| 3,549,180 | 12/1970 | MacWilliams | 285/256 |
| 3,588,149 | 1/1971 | Demler, Sr. . | |
| 3,603,621 | 9/1971 | Parsons . | |
| 3,885,851 | 5/1975 | Bennett . | |
| 4,055,359 | 10/1977 | McWethy . | |
| 4,616,855 | 10/1986 | Ruhle | 285/319 X |
| 4,750,765 | 6/1988 | Cassidy et al. . | |
| 4,781,400 | 11/1988 | Cunningham | 285/921 X |
| 4,929,002 | 5/1990 | Sauer | 285/921 X |
| 5,039,139 | 8/1991 | McElroy | 285/319 |
| 5,058,930 | 10/1991 | Schlosser . | |

FOREIGN PATENT DOCUMENTS

| 275749 | 7/1988 | European Pat. Off. | 285/319 |
|---|---|---|---|
| 532242 | 3/1993 | European Pat. Off. | 285/256 |
| 438194 | 5/1912 | France | 285/319 |

*Primary Examiner*—Randolph A. Reese
*Assistant Examiner*—Heather Chun Shackelford
*Attorney, Agent, or Firm*—Renner, Otto, Boisselle & Sklar

[57] ABSTRACT

A coupling (10) for connecting hoses or other conduits carrying refrigerant material in an automobile air conditioning system has a male end (12) and a female end (14). The male end has an extending portion (26) which is accepted into an aperture (50) in the female end when the coupling ends are connected. A pair of o-aring seals (34), seal the ends in fluid tight engagement when they are connected. Finger portions (24) on legs (22) of a leaf spring (20) mounted on the male end, engage steps (68) on the female end to hold the coupling ends together when engaged. The legs nest in slots (64) to prevent relative rotation of the coupling ends. Tapered portions (66) of the slots provide for ease of engagement of the coupling ends. The legs of the leaf spring are biased apart as the coupling ends are pushed together until the finger portions engage the steps. Disengagement is achieved by spreading the legs of the leaf spring with a special tool (72) and separating the coupling end. Alternative female coupling ends (86, 102) include front steps (94, 104) and back steps (98, 106) which allow the coupling ends to be connected in a temporary manner prior to connection in fluid tight relation.

23 Claims, 9 Drawing Sheets

5,540,463

COUPLINGS FOR AUTOMOBILE AIR CONDITIONING SYSTEM CONDUITS

CROSS REFERENCE TO RELATED APPLICATION

This application is a continuation-in-part of U.S. application No. 07/951,073 filed Sep. 25, 1992, now U.S. Pat. No. 5,374,084

TECHNICAL FIELD

This invention relates to fluid couplings. Specifically, this invention relates to couplings for connecting conduits that carry refrigerant material in an automobile air conditioning system.

BACKGROUND ART

It is common to conduct refrigerant in automobile and other air conditioning systems in flexible hoses or metallic tubes. Often the flexible hoses are fitted with ends that include metallic tube portions. The tube portions are adapted to be connected to various components that are parts of the air conditioning system. Such components may include a condenser, compressor, expansion valve, accumulator or receiver/dryer. The tube ends typically include a type of coupling or fitting that involves turning a threaded fastener to insure a solid connection and to seal the tube in fluid tight relation with the conduit or device to which it is connected.

There are several drawbacks associated with conventional connectors for refrigeration hoses and tubes. First, the requirement of turning a fastener or nut can make connections difficult. This is particularly true in a crowded engine compartment. The process of turning the fastener to tighten or loosen the connector is also time consuming. There is also a risk of damage due to over tightening or leakage due to under tightening.

A further drawback associated with conventional fittings is that they may be brought together in various rotational orientations. This can result in a connected hose being twisted, which stresses the hose and shortens its life. Also, a hose will often rotate with the fastener as it is tightened. This can cause undesirable torsional stresses in the hose as well as improper positioning of the hose in the engine compartment of the car.

Thus, there exists a need for a coupling for conduits used in automotive air conditioning systems that overcomes the problems associated with conventional couplings.

DISCLOSURE OF THE INVENTION

It is an object of the present invention to provide a coupling for fluid conduits that avoids leakage.

It is a further object of the present invention to provide a coupling for fluid conduits that may be readily and quickly connected and disconnected.

It is a further object of the present invention to provide a coupling for fluid conduits that minimizes torsional stresses.

It is a further object of the present invention to provide a coupling that can be used to relieve fluid pressure without disconnection of the coupling ends.

It is a further object of the present invention to provide a coupling for fluid conduits that provides a firm connection and is resistant to vibration.

It is a further object of the present invention to provide a coupling for fluid conduits where the coupling ends can be connected without tools.

Further objects of the present invention will be made apparent in the following Best Modes for Carrying Out Invention and the appended claims.

The foregoing objects are accomplished in the preferred embodiment of the invention by a coupling for releasably connecting a pair of fluid conduits which carry refrigerant material therethrough. The coupling has a male end and a female end.

The female end has an aperture therein. The aperture is bounded by a cylindrical interior wall. The male end has an extending portion. The extending portion is bounded by a cylindrical exterior wall sized for acceptance into the aperture. The male end includes a fluid passage for enabling the refrigerant fluid to flow through the extending portion and into the female end of the coupling.

The extending portion of the male end includes a pair of spaced grooves. O-ring seals are positioned in the grooves and extend between the interior and exterior walls to prevent leakage of refrigerant material out of the coupling when the ends are connected.

The male end includes a leaf spring mounted thereon. The leaf spring is generally u-shaped in cross section and includes a pair of legs with radially inward extending finger portions at the free ends of the legs.

In one embodiment the female end has a circumferentially extending collar portion. The collar portion has a pair of opposed slots therein. The slots are sized to receive the legs of the leaf spring. The slots are bounded inwardly by tapered portions at the bottom of the slots. The tapered portions increase in height with increasing distance from the male end. The slots terminate in radially inward extending steps which are adapted to engage the finger portions of the leaf spring.

Connection of the coupling ends is achieved by pushing the ends together with the legs of the leaf spring in alignment with the slots on the female end. The tapered portions bias the legs of the leaf spring outward until the legs engage the steps. Once engaged, the inter-fitting relation of the slots and the legs of the leaf spring prevent relative rotational movement of the coupling ends.

The coupling ends may be quickly disconnected by spreading the legs of the leaf spring to disengage the finger portions from the steps areas. This may be done with a special tool which makes the task easy. Once this is accomplished, the action of the leaf spring on the tapered portions of the slots aids in separating the ends.

In an alternative embodiment, the female coupling end further includes a circumferentially extending back step. A back tapered portion is adjacent the back step. In this embodiment the coupling ends may be preliminarily connected by engaging the leaf spring legs first with the front steps on the collar portion. Then the connection may be made fluid tight by pushing the coupling ends so the leaf spring legs engage the back step. In disconnecting the coupling ends the steps are disengaged sequentially so that fluid pressure in the conduits may be relieved with the coupling ends connected by the leaf spring legs in engagement with the front steps.

A further alternative embodiment of the invention has a female coupling end with circumferentially extending front and back steps. Front and back tapered portions are positioned adjacent each of the steps to spread the leaf spring legs for ease of engagement with each step. This alternative embodiment provides connection of the coupling ends in rotationally selectable positions.

The coupling of the present invention not only provides for quick connection and disconnection, but a fluid tight seal as well. In addition, because the coupling ends need only to be pushed together to fixably connect them, it is easy to connect the coupling in a crowded engine compartment. In addition with the coupling of the present invention, there is never a problem of over or under tightening.

BEST MODES FOR CARRYING OUT INVENTION

Figure 1:
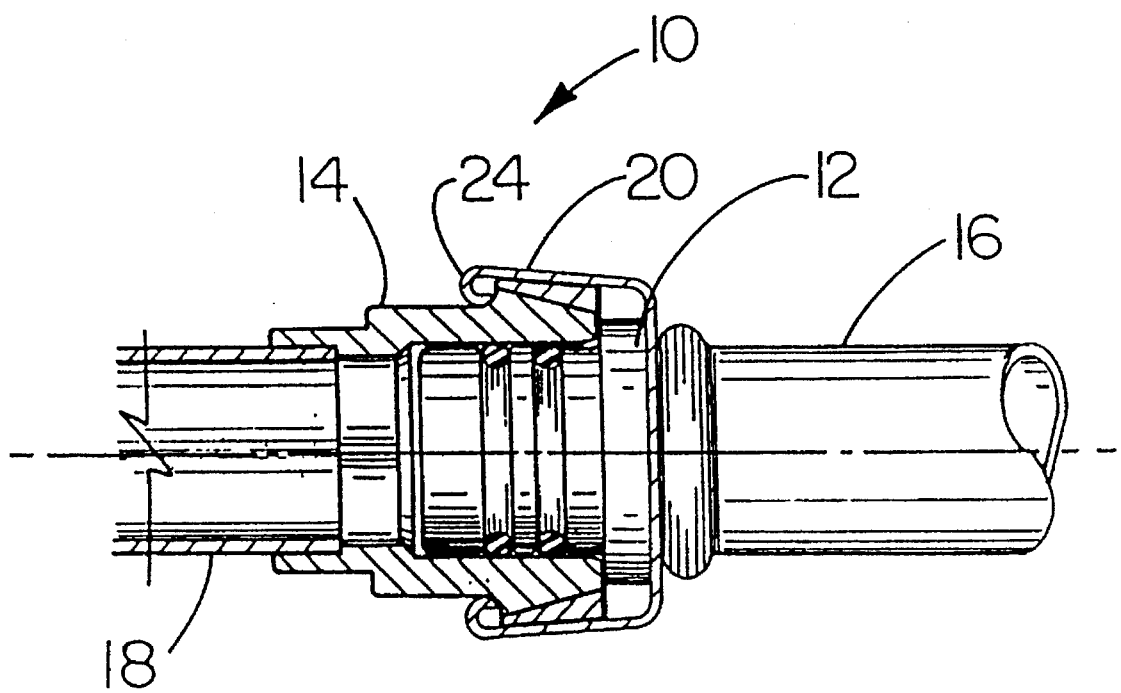
FIG. 1 is a partially sectioned view of the coupling of the present invention in the connected condition, the section of the female coupling end taken along line 4—4 in FIG. 3.

Referring now to the drawings and particularly to FIG. 1 there is shown therein the coupling of a first preferred embodiment of the present invention, generally indicated 10. In FIG. 1 the coupling is shown in connected condition. The coupling has a male end 12 and a female end 14. The male and female ends are shown attached to first and second tubes 16 and 18, respectively. The tubes are adapted for carrying refrigerant material in an automobile air conditioning system. The ends of the tubes that are not shown may be attached to hoses or to components of the air conditioning system such as a receiver/drier, accumulator, compressor, evaporator or condenser.

Figure 2:
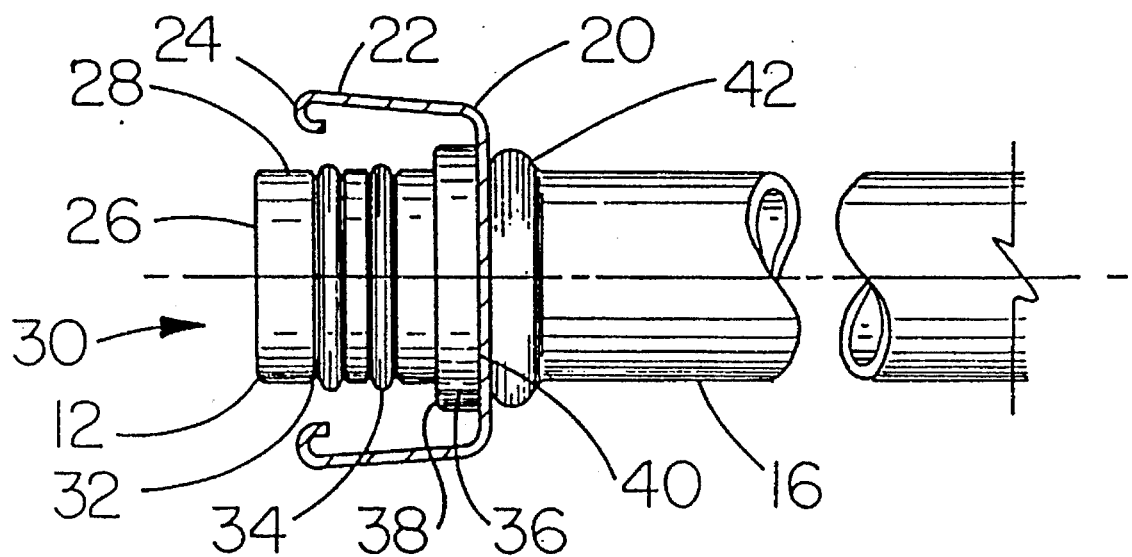
FIG. 2 is a side view of the male coupling end.
Figure 3:
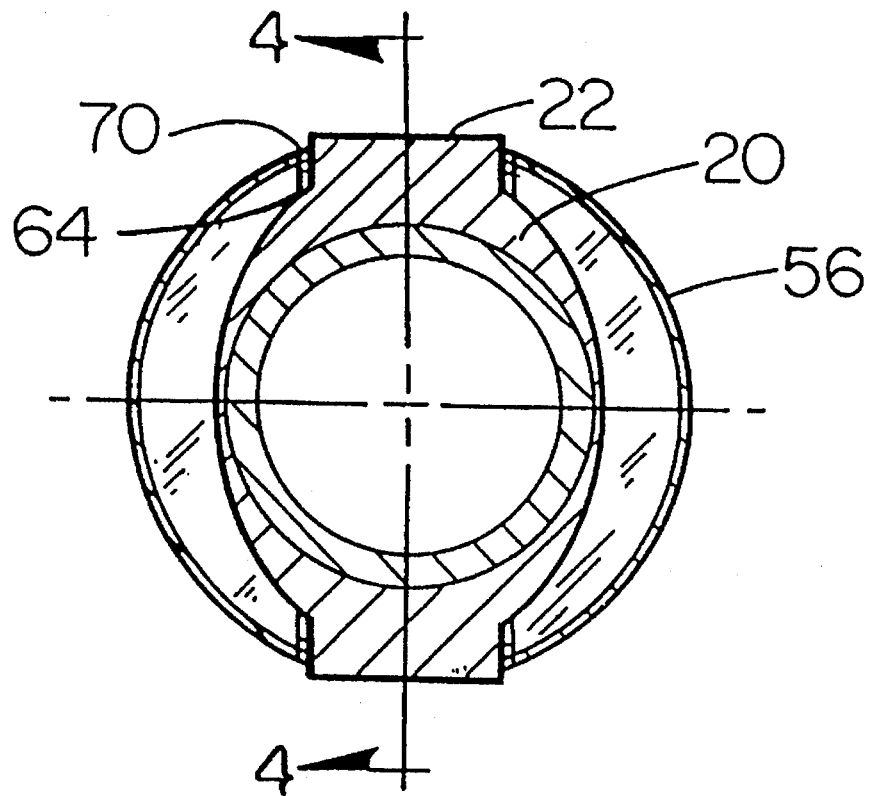
FIG. 3 is a rear view of the coupling ends in connected condition viewed from the rear of the male coupling end.

As shown in FIG. 2, the male end has a leaf spring 20 mounted thereon. Leaf spring 20 has a pair of opposed legs 22 (see FIGS. 7 and 8). Legs 22 have inward extending finger portions 24 that include u-shaped back-turned ends.

Male end 12 has a cylindrical extending portion 26 that is bounded by an exterior wall 28. A fluid passage 30 extends through extending portion 26 and is in fluid communication with tube 16. Male end 12 also has a pair of spaced grooves 32 in exterior wall 28. Resilient o-ring seals are positioned in the grooves 32.

Male end 12 has a radially extending flange portion 36. Flange portion 36 has a front wall 38 and a back wall 40. A bump 42 on tube 16, is positioned so that leaf spring 20 is held in crimped relation between back wall 40 of flange portion 36 and bump 42.

Figure 7:
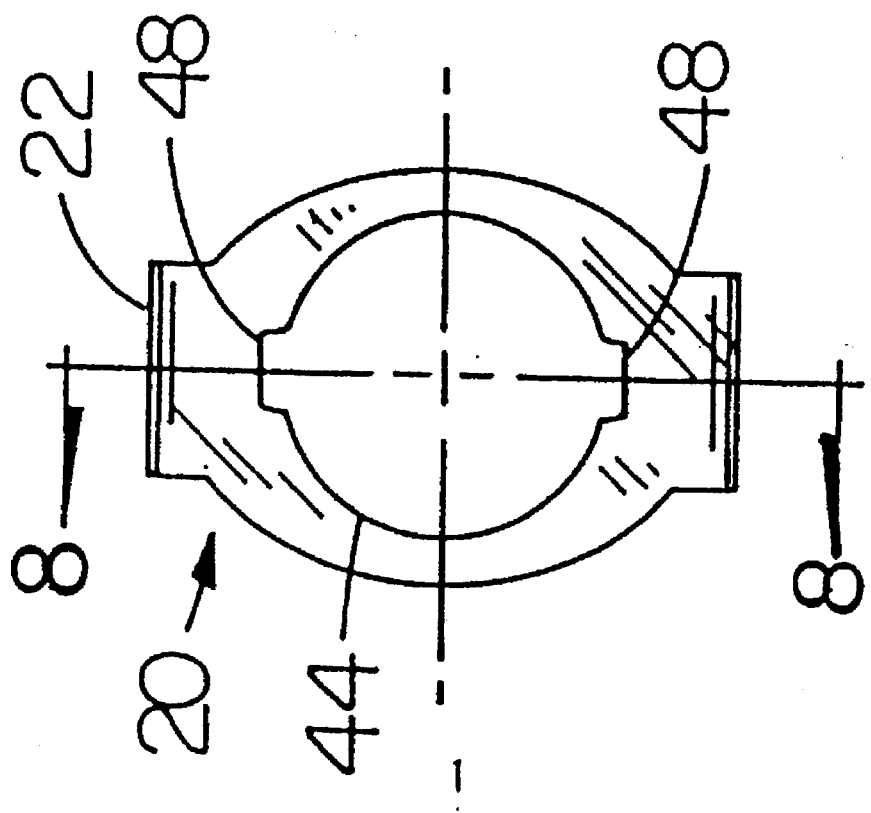
FIG. 7 is a back view of the leaf spring of the coupling.
Figure 8:
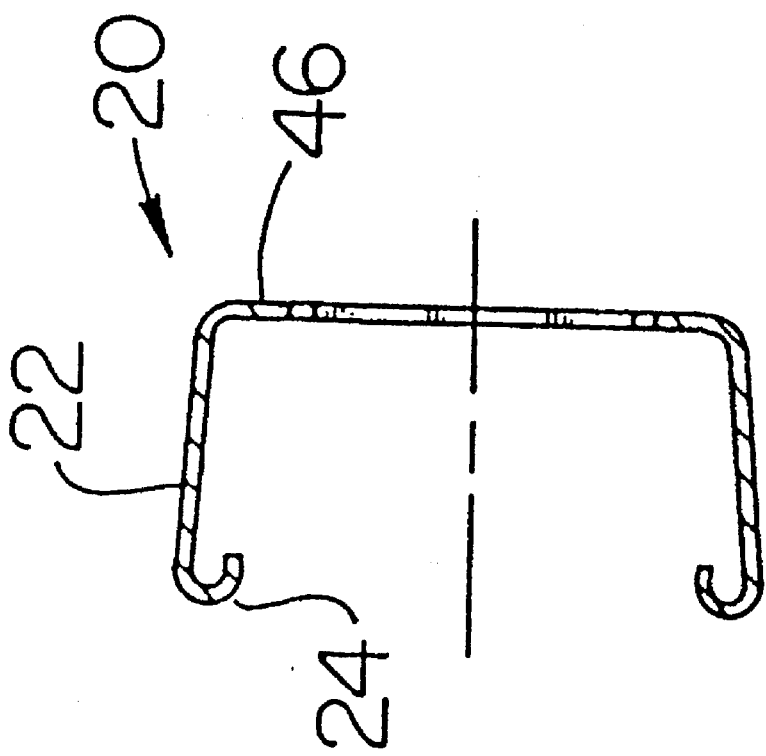
FIG. 8 is a cross sectional view of the leaf spring taken along line 8—8 in FIG. 7.
Figure 9:
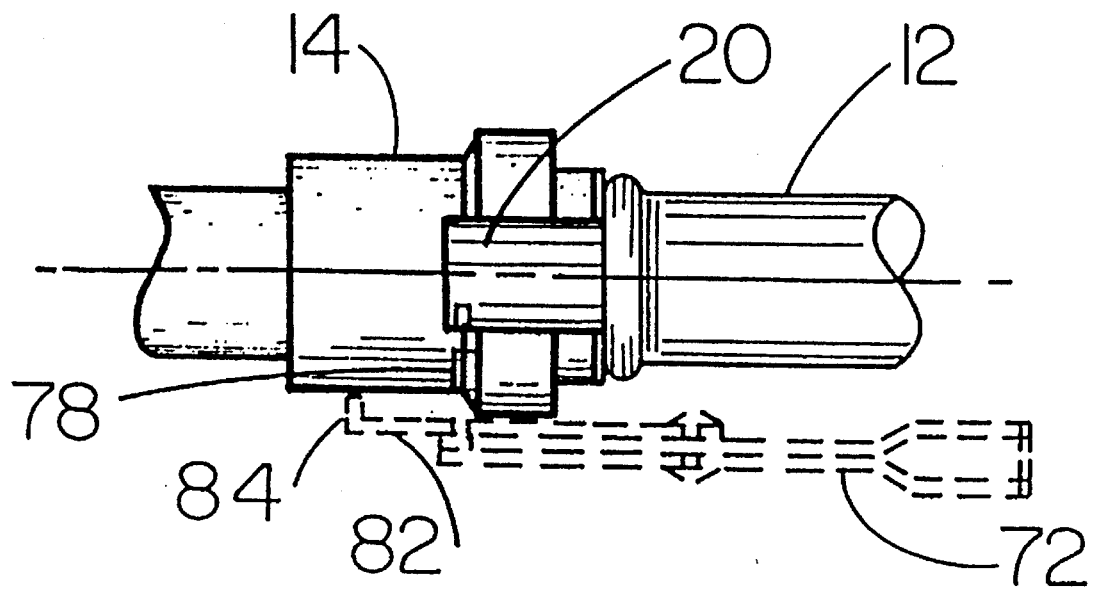
FIG. 9 is a side view of the male and female ends of the coupling in connected condition with the disconnection tool shown in phantom in engaging position.
Figure 10:
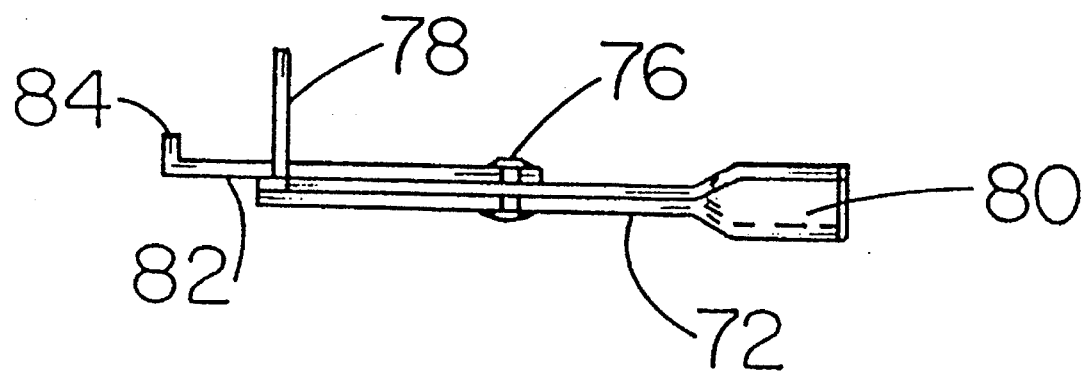
FIG. 10 is a side view of the disconnection tool.
Figure 11:
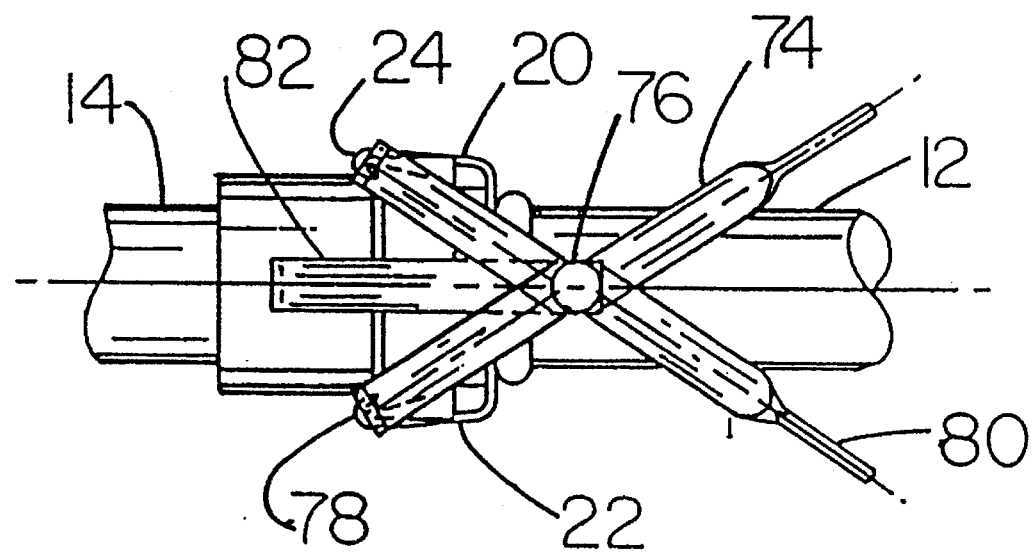
FIG. 11 is a top view of the coupling and disconnection tool, showing the tool disconnecting the coupling ends.

As shown in FIGS. 7 and 8, leaf spring 20 has a generally u-shaped body with a circular opening 44 through a back side member 46. Circular opening 44 includes a pair of cut-outs 48.

Figure 4:
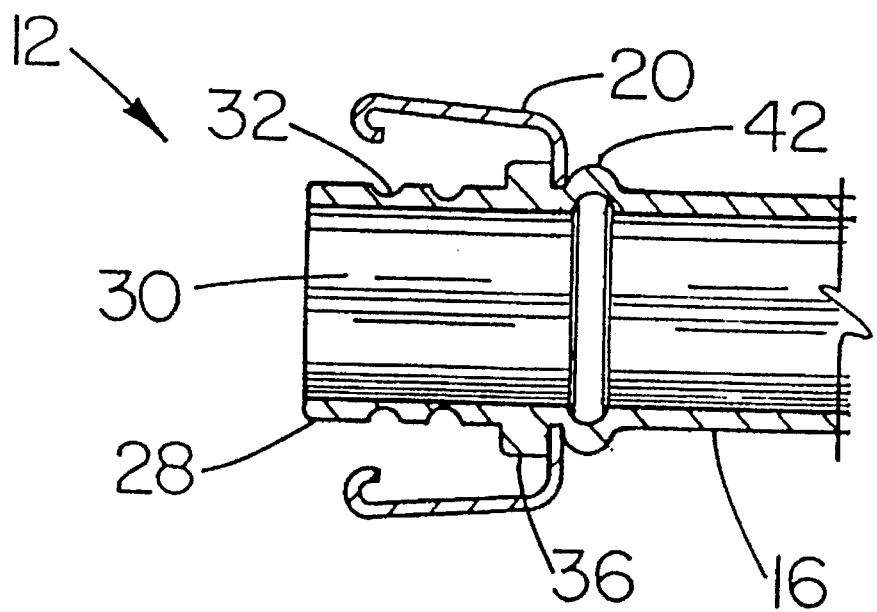
FIG. 4 is a sectional view of the male coupling end taken along line 4—4 in FIG. 3.

As best shown in FIG. 4, male end 12 in the preferred embodiment, is formed integral with tube 16. During the forming process, extending portion 26 and flange portion 36 are formed first. Leaf spring 20 is then installed over the tube, which at that point in the manufacturing process, does not include bump 42. With the back side 46 of the leaf spring abutting back wall 40 of flange portion 36, bump 42 is formed. During the forming process some metal from the tube is crimped into cut-outs 48 which holds the leaf spring in fixed position. As a result, leaf spring 20 cannot rotate on the male end after the male end is formed.

Figure 5:
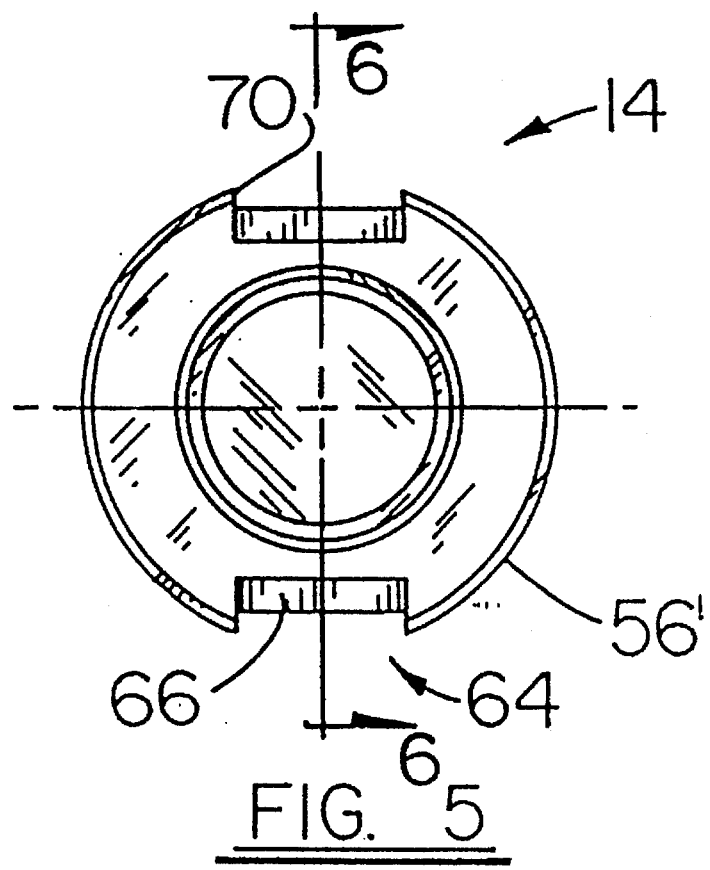
FIG. 5 is a back view of the female coupling end shown in FIG. 1.
Figure 6:
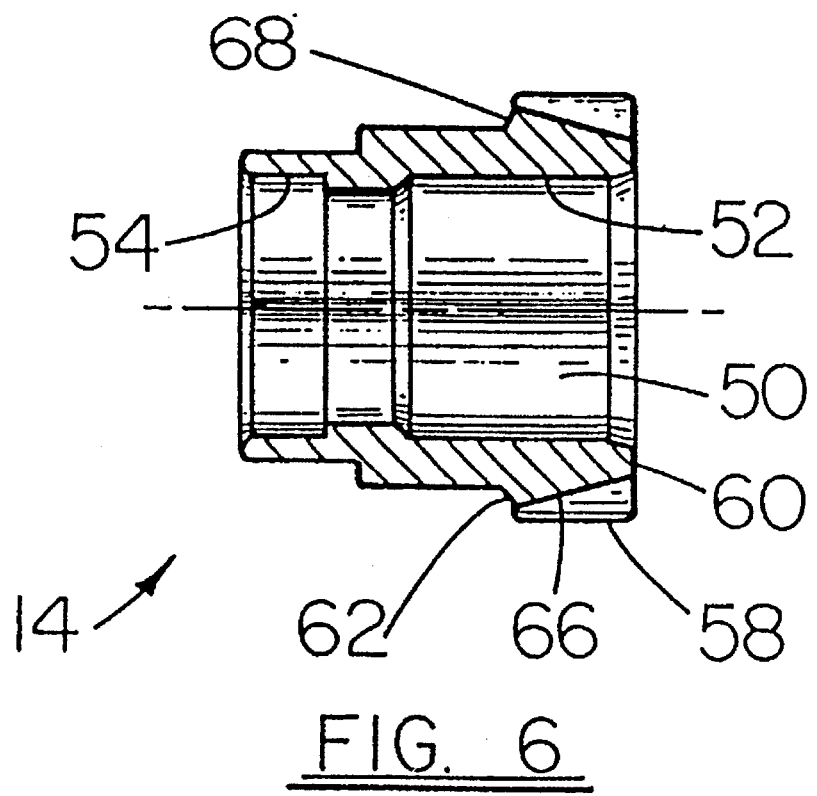
FIG. 6 is a cross sectional view of female coupling end taken along line 6—6 in FIG. 5.

Female end 14 is shown in greater detail in FIGS. 5 and 6. Female end 14 includes an aperture 50 which is bounded by a cylindrical interior wall 52. Aperture 50 is in fluid communication with the interior of tube 18. In the preferred embodiment, tube 18 is attached to female end 14 by brazing the tube into a recess 54 in the female end.

Female end 14 includes a circumferentially extending collar portion 56. Collar portion 56 is bounded by an outer surface 58. Collar portion 56 is further bounded by a front wall surface 60 and a back wall surface 62.

As best shown in FIG. 5, collar portion 56 includes a pair of opposed slots 64. Slots 64 are bounded radially inward by tapered portions 66. The tapered portions 66 terminate at steps 68 on back wall surface 62. Slots 64 are bounded by edges 70 that extend above tapered portions 66 along the entire length of the slots.

When the coupling ends are to be connected, the male end 12 and female end 14 are brought together with the extending portion 26 positioned to enter aperture 50. As the ends are pushed together, tapered portions 66 engage in-turned finger portions 24 of the leaf spring 20. As the ends are pushed further together, the legs are biased outward by the tapered portions until finger portions 24 snap inward on steps 68. The coupling ends are sized such that when the legs of the leaf spring snap into the locked position, the front wall surface 60 of the female end is adjacent to the front wall 38 of flange portion 36.

O-rings 34 serve as seal means when the coupling ends are connected. The o-rings span the area between the exterior wall 28 of the male end and the interior wall 52 of the aperture 50 of the female end. This prevents leakage of the refrigerant material from the coupling. This double o-ring design provides a superior seal and serves to prevent leakage despite vibration and high temperature conditions typically encountered in an automobile engine compartment. In the preferred from of the invention, the o-rings are comprised of neoprene.

The u-shaped finger portions 24 add strength to the connection between the coupling ends by engaging steps 68 with the back turned bends. As a result, pressure forces which would tend to separate the coupling ends, are applied as tensile forces in the legs of the leaf spring. These tensile forces are readily borne by the carbon steel which is used to form the leaf spring of the preferred embodiment.

When it is desired to disconnect the coupling ends, this may be readily done by opening the legs of the leaf spring.

A special tool 72 for separating the coupling ends is shown in FIGS. 9–12. The tool 72 includes a pair of v-shaped members 74 that are connected at a pivot pin 76. Each v-shaped member includes a pin 78 at a first end. Each v-shaped member includes a flattened grip 80 at the end opposite the pins. The tool 72 also includes an arm 82 extending from pivot pin 76. Arm 82 has an inturned lip 84.

Tool 72 is used to release the coupling ends by placing pins 78 of members 74 into the rounded finger portions 24 of leaf spring 20. The grips 80 of tool 72 are then moved together to spread the legs 22 of leaf spring 20. This enables the finger portions to disengage the steps . Further, once the finger portions of the leaf spring come into engagement with the tapered portions of the female coupling end, the biasing force of the leaf spring helps to separate the coupling ends.

Figure 12:
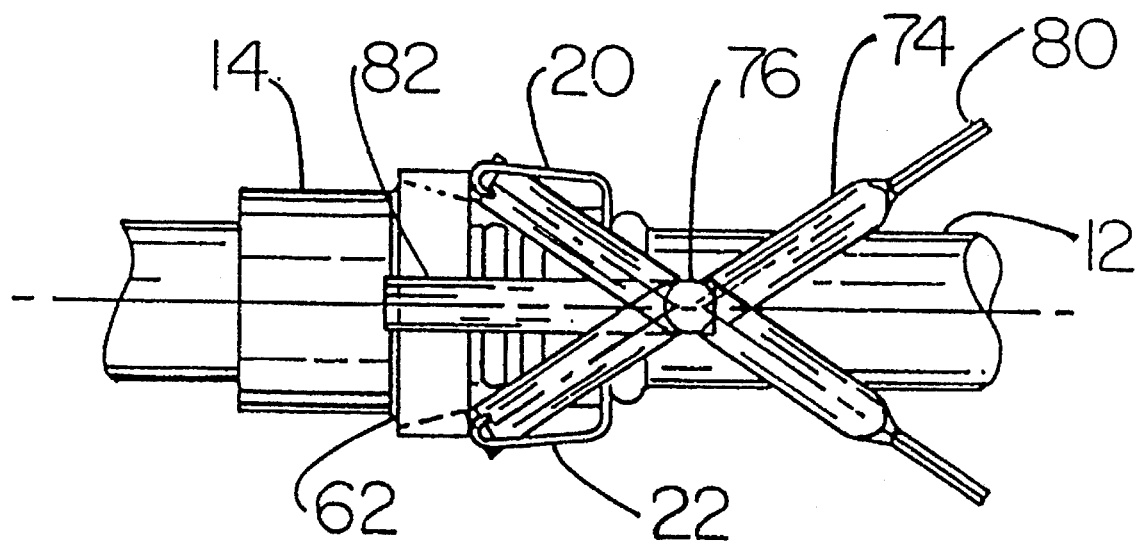
FIG. 12 is a top view of the disconnection tool with the coupling ends separated.
Figure 13:
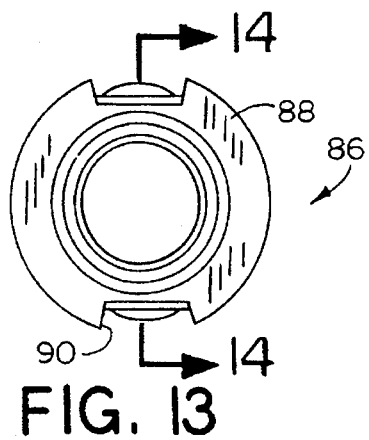
FIG. 13 is an end view of a first alternative female coupling end.
Figure 14:
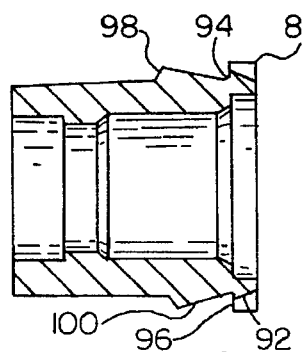
FIG. 14 is a cross sectional view of the alternative female coupling end taken along line 14—14 in FIG. 13.
Figure 15:
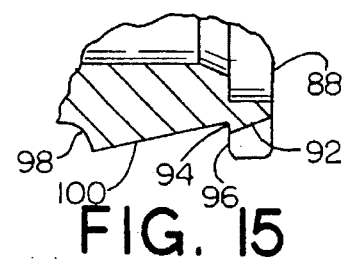
FIG. 15 is an enlarged view of the front and back steps of the female coupling end shown in FIG. 14.

Arm 82 also serves to help minimize the risk of unexpected separation and whipping of the coupling ends in the event they are pressurized. As shown in FIG. 12, lip 84 of arm 82 tends to catch the back wall surface 62 of the female coupling end to hold the ends from moving more than slightly apart. This facilitates controlled release of fluid pressure.

A further advantage of the embodiment of coupling of the present invention shown in FIGS. 1 through 12 is that it resists rotational movement. This is because when the coupling ends are connected, the legs 22 of the leaf spring nest in slots 64. As a result, the slot edges 70 prevent the ends from rotating relative to one another. An advantage associated with avoiding rotation is that the hoses which are attached to the coupling (or the tubes which extend from the coupling) may be mounted so that they are in the desired position for installation in the vehicle. Because no twisting or turning of a fastener is required to connect the coupling ends of the present invention, it is generally assured that the hose which is connected through the coupling is free of torsional stress which could shorten the life of the hose.

The coupling of the present invention is also easy to connect and no tools are required. This is particularly important in a crowded engine compartment. The coupling of the present invention is also well suited to mass production techniques as it requires little time to connect the coupling ends.

A first alternative embodiment of a female coupling end 86 of the present invention is shown in FIGS. 13 through 17. Female coupling end 86 is similar to female coupling end 14 except as otherwise described.

Female coupling end 86 includes a circumferentially extending collar portion 88 with a pair of opposed radially extending slots 90 therethrough. Collar portion 88 is longitudinally thinner than collar portion 56 of the first embodiment. Slots 90 are bounded radially inwardly by front tapered portions 92. Front tapered portions 92 terminate at front steps 94. Front steps 94 are integral with a back wall surface 96 of collar portion 88.

Coupling end 86 further includes a circumferentially extending back step 98 which is larger in diameter than front steps 94. A back tapered portion 100 extends circumferentially about the coupling end between the front step 94 and the back step 98.

Figure 16:
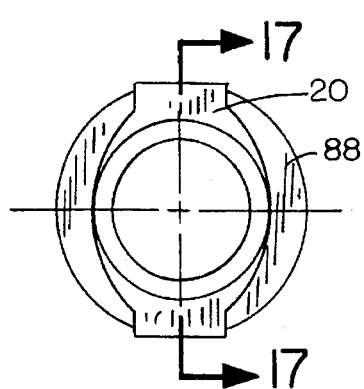
FIG. 16 is a back view of the male coupling end in engagement with the first alternative female coupling end.
Figure 17:
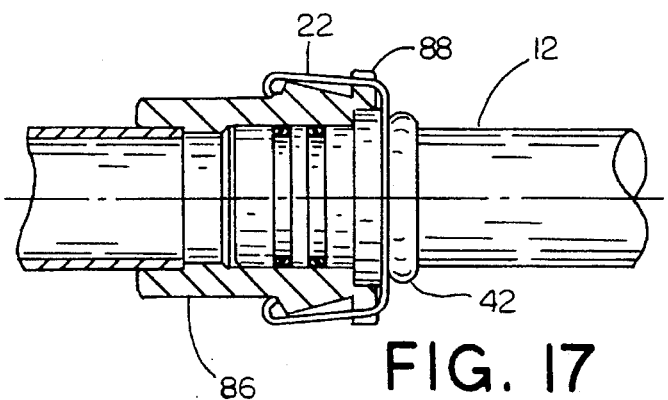
FIG. 17 is a cross sectional view of the female coupling end along line E—E in FIG. 16.
Figure 18:
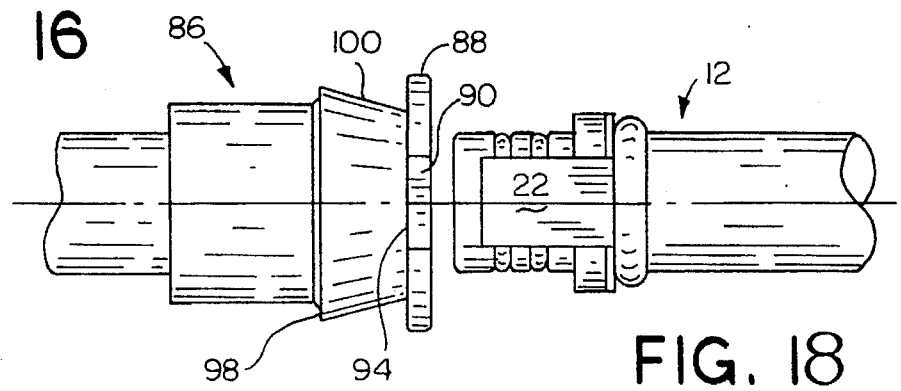
FIG. 18 is a top view of the coupling ends shown in FIG. 17 prior to engagement.
Figure 19:
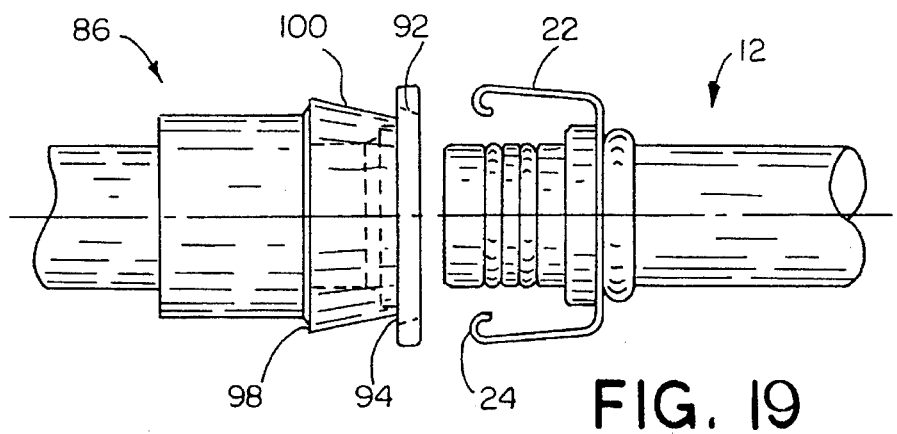
FIG. 19 is a side view of the coupling ends in the position shown in FIG. 18.
Figure 20:
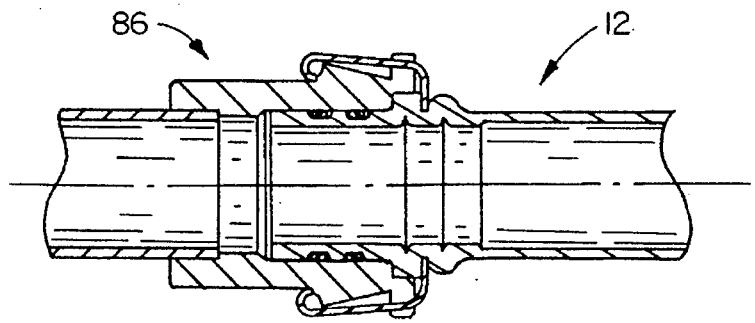
FIG. 20 is a cross sectional view of both coupling ends in FIG. 19 in engaged condition.
Figure 21:
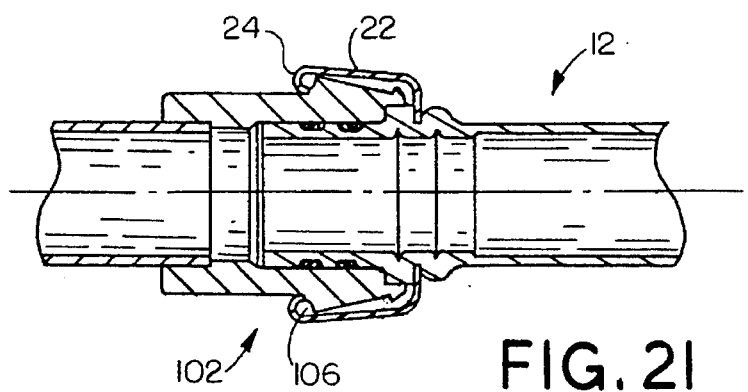
FIG. 21 is a cross sectional view of the male coupling end in engaged relation with a further alternative embodiment of the female coupling end.

Male coupling end 12 is shown in engaged relation with alternative female coupling end 86 in FIGS. 16, 17 and 20. As shown is FIG. 17 the in-turned finger portions of legs 22 of leaf spring 20 engage back step 98 to hold the coupling ends in engagement. In the engaged position legs 22 extend in slots 90 of collar portion 88. This prevents relative rotational movement of the engaged coupling ends.

A significant advantage of the alternative female coupling end is that the male coupling end may be brought into preliminary engagement with the female coupling end by engaging the leaf spring legs 22 with only front steps 94. This may be done with an easy manual pushing action. Thereafter, once it is assured that the connections are properly aligned (for example the preliminary connection is not 180 degrees from optimum). The coupling may be made fluid tight by pushing the coupling ends together so that the leaf spring legs engage back step 98. Of course, the front and back tapered portions 92, 100 in advance of the front and back steps make the connection easier.

In disconnecting the coupling ends, back step 98 is disengaged first. This enables the finger portions 24 of the leaf spring legs to engage the back tapered portion 100 until the legs catch on front steps 94. In this position fluid pressure in the conduits is relieved. This minimizes the risk of unintended total disconnection and pressure release. It should further be noted that in the preferred embodiment front steps 94 have linear edges so they engage the finger portions 24 across their entire width. This gives added strength and minimizes the risk of unwanted premature separation of the coupling ends. For use with this embodiment of the invention, tool 72 may be modified so that arm 82 is slightly shorter to conform with the reduced thickness of collar portion 88. The arm length is reduced so that the coupling ends cannot totally separate with the tool in place. Alternatively the length of arm 82 may be modified to engage back step 98 prior to total disengagement of the coupling ends.

A further alternative embodiment of a female coupling end 102 is shown in FIGS. 21 through 24 and 26. Female end 102 is adapted for selective rotational engagement with male coupling end 12. Coupling end 102 is similar to coupling end 86 except as described herein.

Coupling end 102 has a circumferentially extending front step 104 and a circumferentially extending back step 106. A front tapered portion 108 is positioned adjacent front step 104 and a back tapered portion 110 is positioned adjacent back step 106. As is the case with coupling end 86, the back step 106 has a greater radial distance from the center line of the coupling than front step 104.

Figure 22:
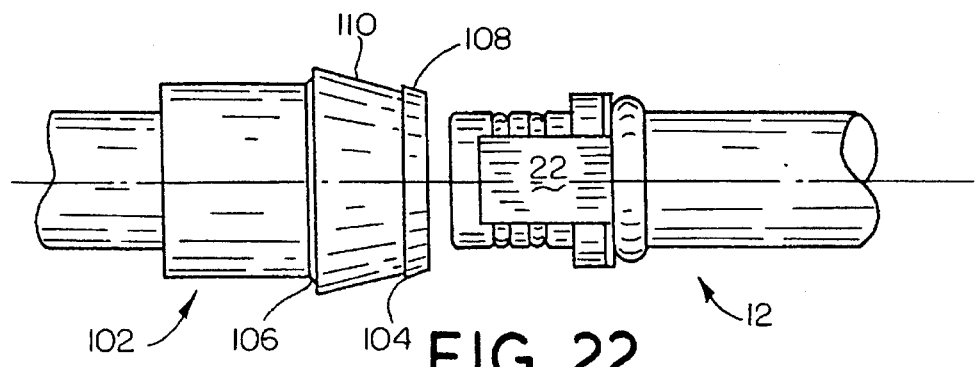
FIG. 22 is a top view of the coupling ends shown in FIG. 20 prior to engagement.
Figure 24:
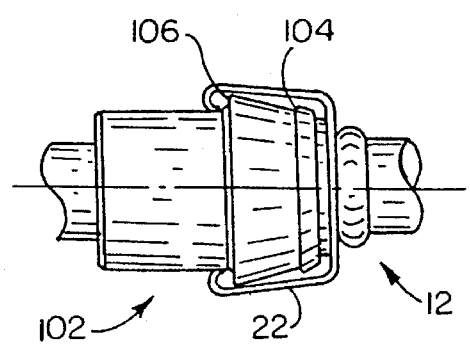
FIG. 24 is a side view of the coupling ends in FIG. 21.
Figure 23:
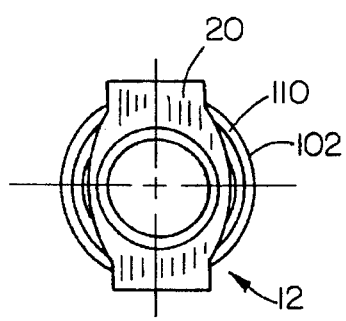
FIG. 23 is a back view of the coupling ends in FIG. 21.
Figure 25:
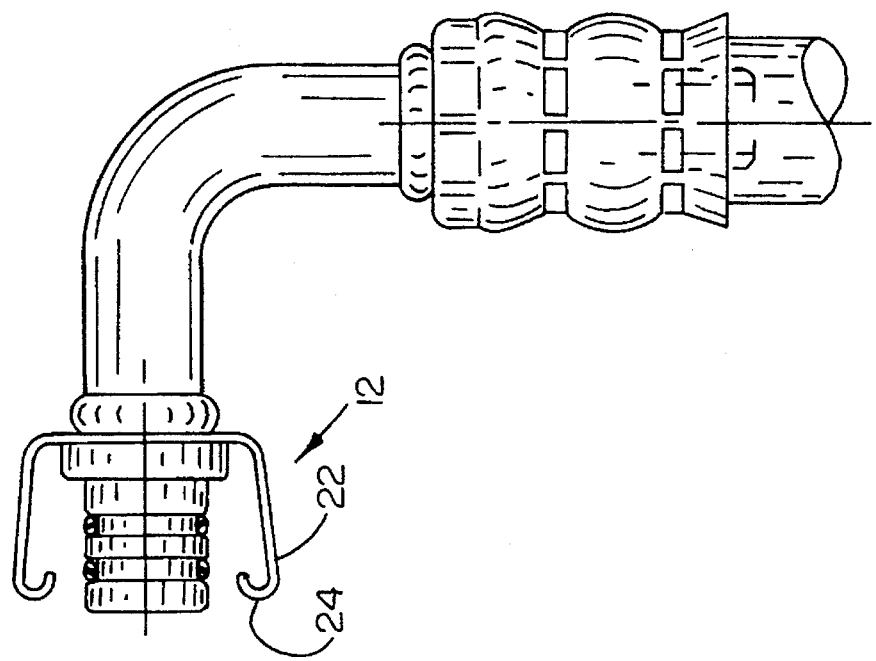
FIG. 25 is a side view of the male coupling end connected to a fluid conduit.
Figure 26:
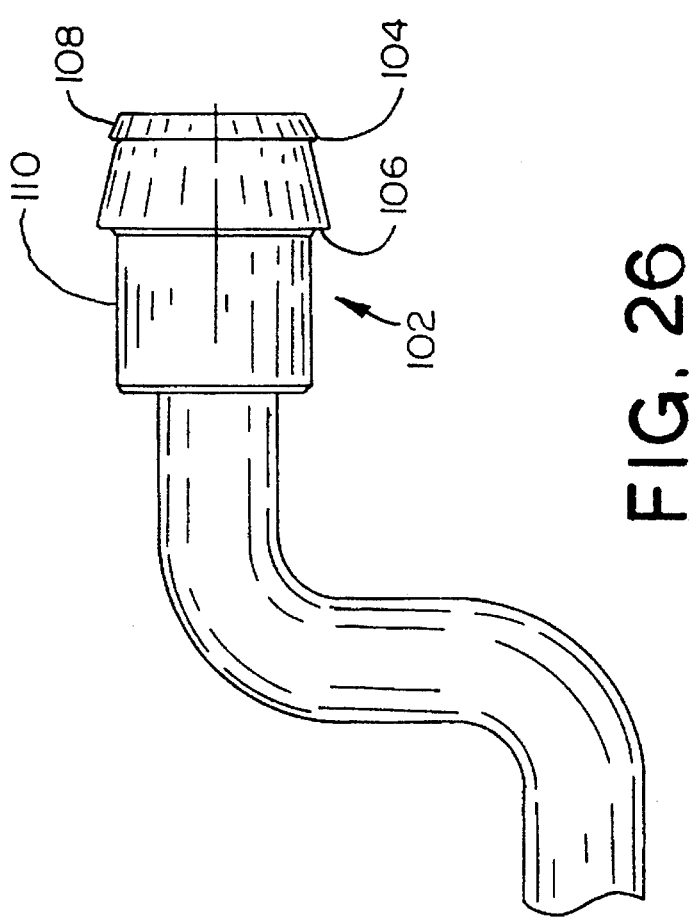
FIG. 26 is a side view of the female coupling end of FIG. 24 connected to a fluid conduit.

As shown in FIG. 22 and 24, coupling end 12 engages coupling end 102 by engagement of the finger portions 24 of the leaf spring legs 22 with back step 106. The coupling ends may be brought into initial engagement by engaging the leaf spring legs 22 with the front step 104. This is done with an easy manual push. After the conduits are aligned in the desired rotational orientation the coupling ends are pushed together into fluid tight relation so that the leaf spring legs engage back step 106. Once the coupling ends are fully engaged the coupling ends are not readily rotatable.

The coupling ends may be disengaged by sequentially engaging the back and front steps. With the leaf springs 22 engaged with the front step 104 fluid pressure in the conduits may be relieved.

Tool 72 may also be used with coupling end 102. However, optimally arm 82 would be modified to catch on back step 106 to prevent unintended disengagement of the coupling ends with the tool in place.

Alternative female coupling end 102 is well suited for applications where the relative rotational positions of the coupling ends cannot be predicted in advance. In this embodiment the connections may be preliminarily made and any undesirable bends or kinks in connected hoses removed. Once the connections are in the desired positions the coupling ends can be further pressed together to the final connected position and will remain in the desired rotational orientation.

It will be understood by those skilled in the art that although the front and back steps of the preferred embodiments extend circumferentially about the female coupling end, in other embodiments the steps may be in discrete step areas. Further, while the couplings of the preferred embodiments have the leaf spring leg members fixably mounted on the male coupling end, in other embodiments the leaf spring leg members may be on the female coupling end, or each coupling end could have one or more leg members fixably mounted thereon.

Thus, the new couplings for automobile air conditioning system conduits of the present invention achieve the above stated objectives, eliminate difficulties encountered in the use of prior devices and systems, solve problems and attain the desirable results described herein.

In the foregoing description, certain terms have been used for brevity, clarity and understanding, however no unnecessary limitations are to be implied therefrom because such terms are for descriptive purposes and are intended to be broadly construed. Moreover, the descriptions and illustrations given are by way of examples and invention is not limited to the exact details shown or described.

Having described the features, discoveries and principles of the invention, the manner in which it is utilized, and the advantages and useful results attained; the new and useful structures, devices, elements, arrangements, parts, combinations, systems, equipment, operations, methods and relationships are set forth in the appended claims.

I claim:

1. A coupling for releasably connecting fluid conduits, comprising:

a first fluid coupling end and a second fluid coupling end;

a first leaf spring leg member mounted to said first coupling end; and, a first front step and a first back step on said second coupling end, said front and back steps in longitudinal alignment and longitudinally disposed from one another, whereby said leaf spring leg member sequentially engages said front and back steps as said coupling ends are engaged in fluid connection; and wherein said leaf spring leg member includes an inward extending finger portion having a back turned bend.

2. The coupling according to claim 1 and further comprising:

a second leaf spring leg member mounted to one of said fluid coupling ends, a second front step and second back step on said other coupling end not mounted to said second leaf spring leg member, said second front and back steps in alignment longitudinally and disposed from one another longitudinally, whereby said second leaf spring leg member engages said second front and back steps sequentially as said coupling ends are engaged in fluid connection.

3. The coupling according to claim 1 wherein said first back step has a greater radial distance from a centerline of said second coupling end than said first front step.

4. The coupling according to claim 1 wherein said second coupling end further comprises a first front tapered portion adjacent said first front step, said first front tapered portion having increasing radial distance from a centerline of said second coupling end with increasing proximity to said first front step.

5. The coupling according to claim 1 and further comprising a second leaf member mounted to said first coupling end, said second leaf spring leg member angularly disposed on said coupling end from said first leaf spring leg member, and a second front step area and a second back step area on said second coupling end, said second front and back step areas longitudinally aligned and disposed from each other longitudinally, whereby said second leaf spring leg member engages said first and second step areas sequentially as said coupling ends are engaged.

6. The coupling according to claim 1 and further comprising a second leaf spring leg member mounted to said first coupling end and wherein said back step extends circumferentially about said second coupling end.

7. The coupling according to claim 6 wherein said first step extends circumferentially about said second coupling end.

8. The coupling according to claim 7 wherein said second coupling end further comprises a front tapered portion adjacent said front step and a back tapered portion adjacent said back step, each of said tapered portions extending circumferentially about said second coupling end, each said tapered portion having increasing diameter with increasing proximity to said adjacent step.

9. The coupling according to claim 7 wherein said first and said second leaf spring leg members each include an inward extending finger portion having a back turned bend.

10. A coupling for releasably connecting fluid conduits, comprising:

a first fluid coupling end and a second fluid coupling end;

a first leaf spring leg member mounted to said first coupling end; and, a first front step and a first back step on said second coupling end, said front and back steps in longitudinal alignment and longitudinally disposed from one another, whereby said leaf spring leg member sequentially engages said front and back steps as said coupling ends are engaged in fluid connection; and wherein said second coupling end further comprises a first back tapered portion adjacent said first back step, said first back tapered portion having increasing radial distance from a centerline of said second coupling end with increasing proximity to said first back step; and wherein said first coupling end has a tubular insert portion at least partly longitudinally coextensive with said leaf spring member, and said second coupling end has a tubular collar portion for receiving said tubular insert portion.

11. A coupling for releasably connecting fluid conduits, comprising:

a first fluid coupling end and a second fluid coupling end;

a first leaf spring leg member mounted to said first coupling end; and, a first front step and a first back step on said second coupling end, said front and back steps in longitudinal alignment and longitudinally disposed from one another, whereby said leaf spring leg member sequentially engages said front and back steps as said coupling ends are engaged in fluid connection; and wherein said second coupling end further comprises a first front tapered portion adjacent said first front step, said first front tapered portion having increasing radial distance from a centerline of said second coupling end with increasing proximity to said first front step; and wherein said second coupling end further comprises a first back tapered portion adjacent said first back step, said first back tapered portion having increasing radial distance from a centerline of said second coupling end with increasing proximity to said first back step.

12. A coupling for releasably connecting fluid conduits, comprising:

a first fluid coupling end and a second fluid coupling end;

a first leaf spring leg member mounted to said first coupling end; and, a first front step and a first back step on said second coupling end, said front and back steps in longitudinal alignment and longitudinally disposed from one another, whereby said leaf spring leg member sequentially engages said front and back steps as said coupling ends are engaged in fluid connection; and wherein said second coupling end further comprises a collar portion including a longitudinal slot therein, said first leaf spring leg member extending in said slot when said coupling ends are in engagement, whereby relative rotation of said engaged ends is prevented.

13. A coupling for releasably connecting fluid conduits, comprising:

a first fluid coupling end and a second fluid coupling end;

a first leaf spring leg member mounted to said first coupling end;

a first front step and a first back step on said second coupling end, said front and back steps in longitudinal alignment and longitudinally disposed from one another, whereby said leaf spring leg member sequentially engages said front and back steps as said coupling ends are engaged in fluid connection; and a second leaf spring leg member mounted to said first coupling end and wherein said back step extends circumferentially about said second coupling end; and wherein said second coupling end includes a collar portion having a pair of diametrically opposed slots therein, and wherein a leaf spring leg member is accepted in each of said slots when said coupling ends are engaged, and wherein said collar portion has a radially extending back wall surface and said back wall surface includes said front step.

14. The coupling according to claim 13 wherein each of said slots are bounded radially inward by a first tapered portion, said first tapered portion having increasing radial distance from a centerline of said second coupling end with increasing proximity to said front step.

15. The coupling according to claim 14 wherein said second coupling end includes a second tapered portion, said second tapered portion having increasing radial distance from said centerline with proximity to said back step.

16. The coupling according to claim 15 wherein one of said coupling ends includes an extending portion having a fluid passage therethrough, and the other of said coupling ends includes an aperture for accepting said extending portion therein.

17. A coupling for releasably connecting fluid conduits, comprising:

a first fluid coupling end and a second fluid coupling end;

a first leaf spring leg member mounted to said first coupling end;

a first front step and a first back step on said second coupling end, said front and back steps in longitudinal alignment and longitudinally disposed from one another, whereby said leaf spring leg member sequentially engages said front and back steps as said coupling ends are engaged in fluid connection; and a second leaf spring leg member mounted to said first coupling end and wherein said back step extends circumferentially about said second coupling end; and wherein said second coupling end further comprises a radially extending collar portion including at least one longitudinally extending slot therein, and wherein at least one of said leaf spring leg members is accepted in said slot when said coupling ends are engaged whereby relative rotation of said coupling ends is prevented.

18. A fluid coupling end comprising:

an elongated tubular member having a free end;

a flange portion proximate said free end having a radially extending back wall facing away from said free end;

a leaf spring having a pair of leaf spring leg members extending axially, each leaf spring leg member including a turned-in finger portion, said leaf spring further including a back side member having an opening therethrough for mounting of said leaf spring onto said tubular member, said back side member in abutting relationship with said back wall of said flange portion; and a circumferentially extending bump integral with said flange portion, wherein said back side member of said leaf spring is contacted by and is in sandwiched relation between said bump and said flange member; and wherein said flange portion has a radially extending front wall facing said free end forming a right angle shoulder, whereby said front wall may function to engage a front wall surface of a mating coupling end to limit the extent of insertion of said tubular portion in relation to the mating coupling end.

19. A fluid coupling end comprising:

a flange portion having a back wall;

a generally U-shaped leaf spring having a pair of leaf spring leg members, each leaf spring leg member including a turned-in finger portion, said leaf spring further including a back side member having an opening therethrough, said back side member in abutting relating with said back wall of said flange portion; and a circumferentially extending bump, wherein said back side member of said leaf spring is in sandwiched relation between said bump and said flange member; and wherein said back side member of said leaf spring includes at least one cut out into which a portion of said bump extends radially, whereby relative rotational movement of said leaf spring is prevented.

20. The coupling end according to claim 19 wherein each of said finger portions of said leaf spring leg members include a back turned bend.

21. A fluid coupling end comprising a front step and a back step, said front and back steps disposed from each other, longitudinally and aligned in the longitudinal direction;

a front tapered portion adjacent said front step and a back tapered portion adjacent said back step, each of said tapered portions having increasing radial distance from a centerline of said coupling end with increasing proximity to said adjacent step; and a radially extending collar portion including at least one slot therein, said slot in longitudinal alignment with said front and back steps and said front and back tapered portions.

22. A coupling releasably connecting fluid conduits in fluid tight relation and enabling the flow of fluid material therethrough, comprising:

a first coupling end and a second coupling end, each coupling end having a fluid passage therethrough, said fluid passages connected in fluid tight relation when said coupling ends are engaged;

a pair of leaf spring leg members, each said leaf spring leg member mounted at a first member end to said first coupling end, said leaf spring leg members extending generally longitudinally and diametrically opposed, each leg member having a radially extending finger portion at a second member end disposed from said first member end;

a pair of longitudinally spaced apart step areas on said second coupling end, each step area engaging a finger portion of a leg member when said coupling ends are engaged, and a tapered portion adjacent each step area, the radial height of each said tapered portion increasing with proximity to said adjacent step area; and at least one longitudinally extending slot on one of said coupling ends, wherein a leg member is accepted in said slot when said coupling ends are engaged and relative rotational movement of said coupling ends is prevented.

23. A fluid coupling end comprising:

a tubular portion having a terminal end; and a leaf spring having plural angularly offset leaf spring leg members extending generally parallel to the axis of said tubular portion, each leaf spring leg member including at a free end thereof a finger portion extending radially with respect to the axis of said tubular portion, said leaf spring further including a back side member from which said leaf spring leg members extend and having an opening through which said tubular member extends, said back side member being mounted to said tubular portion, said leaf spring leg members and back side member being formed by a unitary body of uniform thickness, and said leaf spring leg members extending from said back side member towards said terminal end of said tubular portion and wherein said tubular member has axially spaced apart radially extending protrusions between which the back side member is axially trapped.

\* \* \* \* \*